(12) United States Patent
Gandini et al.

(10) Patent No.: US 6,485,635 B1
(45) Date of Patent: Nov. 26, 2002

(54) FILTER, IN PARTICULAR FOR THE LUBRICATING OIL OF AN INTERNAL COMBUSTION ENGINE

(75) Inventors: Sergio Gandini, Kornwestheim (DE); Thomas Petschl, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/341,467

(22) PCT Filed: Dec. 13, 1997

(86) PCT No.: PCT/EP97/07015

§ 371 (c)(1), (2), (4) Date: Aug. 24, 1999

(87) PCT Pub. No.: WO98/30310

PCT Pub. Date: Jul. 16, 1998

(30) Foreign Application Priority Data

Jan. 10, 1997 (DE) ......................................... 197 00 564

(51) Int. Cl.[7] ............................................. B01D 35/153
(52) U.S. Cl. ........................ 210/117; 210/136; 210/238; 210/440; 210/457; 210/470; 210/493.2; 210/DIG. 17
(58) Field of Search .................................. 210/130, 136, 210/238, 440, 441, 442, 450, 457, 470, 493.2, DIG. 17, 249, 168, 429, 493.1, 117

(56) References Cited

U.S. PATENT DOCUMENTS

| | | | | |
|---|---|---|---|---|
| 2,472,012 A | * | 5/1949 | Hanneman | 210/457 |
| 2,743,018 A | * | 4/1956 | Belgarde | 210/457 |
| 2,933,192 A | * | 4/1960 | Gretzinger | 210/316 |
| 3,868,325 A | * | 2/1975 | Otto | 210/232 |
| 4,452,695 A | * | 6/1984 | Schmidt | 210/249 |
| 4,637,873 A | * | 1/1987 | DeSousa et al. | 210/169 |
| 5,589,060 A | * | 12/1996 | Gebert et al. | 210/130 |
| 5,762,788 A | * | 6/1998 | Gullett | 210/440 |
| 6,016,923 A | * | 1/2000 | Baumann | 210/493.2 |

FOREIGN PATENT DOCUMENTS

| | | | |
|---|---|---|---|
| DE | 4139680 | * | 6/1993 |
| EP | 616825 | * | 9/1994 |
| EP | 773054 | * | 5/1997 |
| FR | 2229444 | * | 12/1974 |

* cited by examiner

Primary Examiner—Matthew O. Savage
(74) Attorney, Agent, or Firm—Crowell & Moring LLP

(57) ABSTRACT

A filter, in particular for the lubricating oil of an internal combustion engine, which includes a pot-shaped filter housing (10), a support tube (11) disposed therein and a filter element (14) secured on the support tube (11). The filter element is essentially made up of a filtering material which is folded in a pleated manner and has plates (15 and 16) at its ends. The filter housing provides a direct seal between itself and a flange (19), and the support tube is provided with a screw-on thread (21).

3 Claims, 1 Drawing Sheet

FILTER, IN PARTICULAR FOR THE LUBRICATING OIL OF AN INTERNAL COMBUSTION ENGINE

BACKGROUND OF THE INVENTION

The invention relates to a filter, in particular for the lubricating oil of an internal combustion engine.

Such a filter is, for example, known from DE 41 39 680. This filter has according to FIG. 1 of the publication, an annular filter cartridge which is pushed onto a central tube with the assistance of gaskets 18, 19. The central tube is connected fast with a bell housing 11, by means of which a simplification of the structural assembly can be achieved in a high degree of economy. The bell housing is attached, for example to a motor block, by means of an adapter 15. By using different adapters, a flexible utilization of the filter with different sizes of connectors is possible.

However, the disclosed structure also has disadvantages. As a result of the use of the adapter, it becomes necessary to incur an additional sealing expense in the form of gasket rings 14, 24. Also, the gaskets, which are used for sealing the filter cartridge, have a complex structure, so that no standard parts can be used.

SUMMARY OF THE INVENTION

The invention therefore is addressed to the object of providing a filter, especially for lubricant oil of an internal combustion engine, which will consist of few parts and thus will be easy to service as well as inexpensive. This object is achieved by the invention as described and claimed hereinafter.

The substantial advantage of the invention is to be seen in the fact that the filter in the basic version consists of four component parts, namely a housing, a center tube, a metal-free cartridge and a gasket. In a preferred manner the housing is an injection molded synthetic resin part. This part is very inexpensive to manufacture and can also be made, for example, from recycled material.

The filter is provided with a replaceable filter element. The filter element is merely pushed over the supporting tube and has a radial gasket.

The entire housing is open toward a flange. This means that no end plate closing the pot-shaped housing is necessary. By the elimination of the end plate, direct access to the filter element is assured, so that it can be replaced without special tools.

In one embodiment of the invention provision is made for the support tube to be threaded into the housing or, when injection molded plastic is used, for it to be welded by ultrasound or high frequency or adhesively joined.

The filter element in one embodiment of the invention is provided with end plates which are made of nitrile rubber and thus have a high elasticity. In this way additional sealing means can be omitted. The end plates themselves produce a radial sealing of the filter element. In a preferred embodiment a filter element bypass valve can be arranged on the supporting tube. The possibility also exists for arranging a non-return valve in the supporting tube. Both valves are of simple construction and consist substantially of a valve spring and a valve plate.

Usually the filter element is mounted floatingly on the support tube, i.e. its axial position is defined by the abutment on the bottom of the housing. For precise fixation of the filter element, a catch element can be provided on the support tube, which prevents displacement of the filter element. It is also possible to provide a sleeve or the like on the support tube for the fixation of the filter element.

To prevent raw oil, i.e. oil that has not yet been filtered, from flowing in reverse direction, the end plate facing the flange can be equipped with a non-return valve, for example in the form of a one-piece profile gasket. In this way the filter is effectively prevented from running empty.

These and additional features of preferred embodiments of the invention will be found not only in the claims but also in the description and the drawings, and the individual features can each be realized individually or together in the form of subcombinations in the embodiments of the invention and in other fields, and can constitute advantageous as well as independently patentable embodiments, for which protection is hereby claimed.

BRIEF DESCRIPTION OF THE DRAWINGS

The invention will be explained in further detail hereinafter with reference to illustrative embodiments.

DETAILED DESCRIPTION OF PREFERRED EMBODIMENTS

Figure 1:
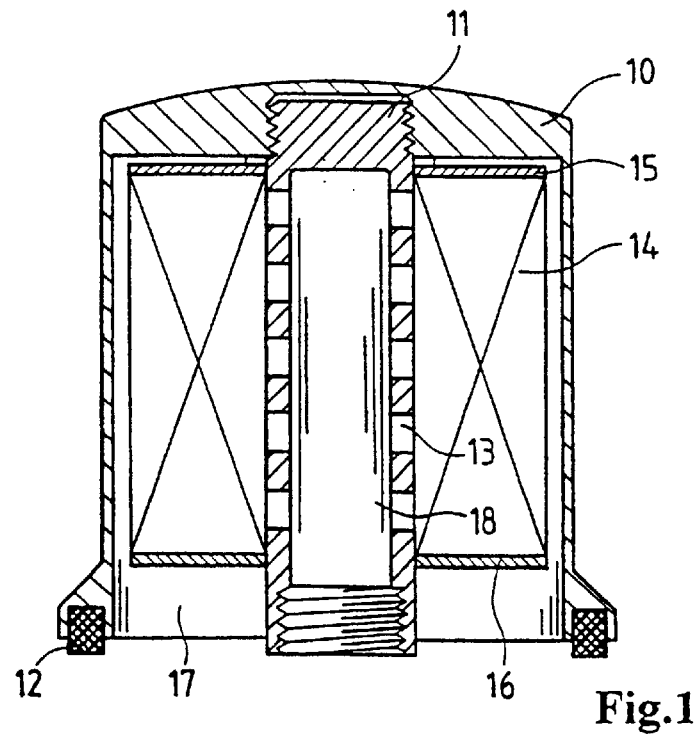
FIG. 1 shows a sectional view of a simple filter.

The filter according to FIG. 1 comprises a pot-shaped housing 10. Into this housing a support tube 11 is screwed. The housing carries a profile gasket 12 on the axial end facing a mounting flange. A filter element 14 is pushed onto the support tube 11 which is provided with openings 13. This filter element 14 is comprised of a pleated filter material which is provided at the ends with end plates 15 and 16. In conjunction with the outer surface of the support tube the end plates form a radial seal at their inner annular opening and thereby seal the raw liquid area 17 from the clean liquid area 18. The filter element 14 is merely slipped onto the support tube 11. The sealing areas of the end plates provide for a secure retention of the filter in the filter housing.

Figure 2:
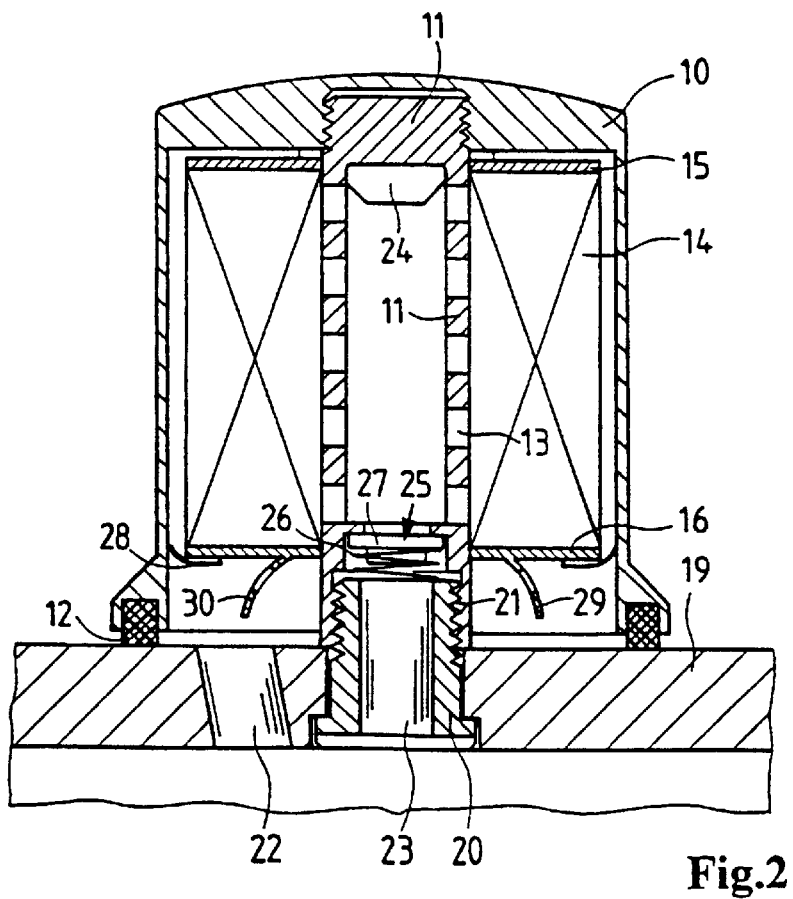
FIG. 2 shows the simple filter depicted in FIG. 1 with additional elements.

In FIG. 2 a filter with additional features is shown. The filter is fastened on a flange 19, a hollow screw 20 being provided on the flange which meshes with the thread 21 on the support tube 11. The introduction of the liquid to be cleaned takes place through the opening 22, and the return flow takes place through the already mentioned hollow screw 20 and its opening 23.

In the support tube 11 is a filter element bypass valve 24 and a back-flow check valve 25. The check valve consists essentially of a spring 26 and a valve plate 27. A check valve for the raw liquid in the form of a sealing lip 28 is disposed on the filter element 14, i.e. on its end plate 16. Also, two removal tabs 29 and 30 are provided on the end plate 16. These facilitate the removal of the filter element 14. The filter element 14 can thus be pulled off from the support tube manually or with a simple tool.

The replacement of the filter element can be carried out in different ways. As already mentioned, it is possible to pull off the filter element 14 from the support tube and replace it with a new one. But there is also the alternative possibility of releasing the connection between the support tube 11 and housing 10, unscrewing the support tube, and pulling the filter element off at the opposite end of the support tube. It also should be mentioned that there is also the possibility of replacing the entire filter with a new one. The used filter can be delivered to a recycling plant.

What is claimed is:

1. A filter comprising:

a pot-shaped filter housing, a filter element support tube disposed in the filter housing, a return flow check valve disposed in the support tube and having a spring and a valve plate, wherein said valve bears against a valve seat disposed in said support tube, and a filter element arranged on the support tube, said filter element consisting essentially of a pleated annular filter material with a pair of resilient end plates affixed to respective end faces thereof, said filter element being pushed onto said support tube with each of said end plates forming a radial seal with said support tube, said support tube having an attachment thread which can be screwed onto a mating threaded portion on a mounting flange to attach the filter to the mounting flange, wherein the spring of said return check valve is axially disposed between said valve plate and the mating threaded portion of said mounting flange, and said filter housing directly receiving a gasket for sealing said housing to the mounting flange.

2. A filter comprising:

a pot-shaped filter housing, a filter element support tube disposed in the filter housing, and a filter element arranged on the support tube, said filter element consisting essentially of a pleated annular filter material with a pair of resilient end plates affixed to respective end faces thereof, one of the end plates including an exposed major surface that axially faces an open end of said filter housing, a removal tab fixedly attached onto said exposed major surface to facilitate removal of said filter element from the open end of said pot shaped housing, said filter element being pushed onto said support tube with each of said end plates forming a radial seal with said support tube, said support tube having an attachment thread which can be screwed onto a mating thread on a mounting flange to attach the filter to the mounting flange, and said filter housing directly receiving a gasket for sealing said housing to the mounting flange.

3. A filter comprising:

a pot-shaped filter housing, a filter element support tube disposed in the filter housing, and a filter element arranged on the support tube, said filter element consisting essentially of a pleated annular filter material with a pair of resilient end plates affixed to respective end faces thereof, one of the end plates including an exposed major surface axially facing an opening of said filter housing, said one end plate having a radially outer peripheral edge positioned adjacent a cylindrical inner surface portion of said filter housing, said filter element being pushed onto said support tube with each of said end plates forming a radial seal with said support tube, and a sealing lip check valve comprising a resilient sealing lip attached to the exposed major surface of said one filter element, said sealing lip extending radially outwardly from the radially outer peripheral edge of said one end cap into sealing contact with said cylindrical inner surface portion of the filter housing, such that the resilient sealing lip is operable to admit unfiltered liquid from a supply line to a raw liquid chamber surrounding said filtering material and prevent back flow of the unfiltered liquid from the raw liquid chamber to the supply line, said support tube having an attachment thread which can be screwed onto a mating thread on a mounting flange to attach the filter to the mounting flange, and said filter housing directly receiving a gasket for sealing said housing to the mounting flange, wherein during replacement of the filter element, the resilient sealing lip is removable along with the filter element as an integral unit from the support tube.

* * * * *